Oct. 21, 1941. E. L. SCHMIDT ET AL 2,259,834

WING NUT AND PROCESS FOR THE MANUFACTURE THEREOF

Filed Sept. 14, 1940

INVENTOR
ERWIN L. SCHMIDT
JOSEPH L. SCHWABE, JR.
BY
Wheeler, Wheeler & Wheeler

Patented Oct. 21, 1941

2,259,834

UNITED STATES PATENT OFFICE 2,259,834

WING NUT AND PROCESS FOR THE MANUFACTURE THEREOF

Erwin L. Schmidt and Joseph L. Schwabe, Jr., Milwaukee, Wis., assignors to G-H Specialty Co., Milwaukee, Wis., a corporation of Wisconsin Application September 14, 1940, Serial No. 356,728

10 Claims. (Cl. 10—86)

This invention relates to improvements in wing nuts and processes for the manufacture thereof.

It is the primary object of the invention to provide a novel and improved sheet metal wing nut and means whereby such a nut can be made in simple form and by a simple method to make the product more economical of manufacture than any previous device and at the same time more serviceable and better adapted for use upon wooden furniture or the like. It is one of the major purposes of the construction to provide a broad, flat, washer-like surface from which the wings are formed integrally and are offset so that said surface may be engaged with a wooden object and tightened thereon without embedding the nut in the wood or destroying the finish of the wood.

While our improved wing nut has particular advantages for use in connection with wooden articles, it is by no means limited to such use. One of the objects of the invention is to provide a wing nut which will not only afford a better and more convenient grip to be more readily held and manipulated, but one to which a wrench or other tool may be easily applied to exert more pressure than is available manually.

Still another object of the invention is to provide a wing nut of such a character as to protect the operator against injury in applying the nut. In the use of other wing nuts it is a common experience for the operator to become scratched or cut or to suffer injury from a splinter through accidental contact with the bolt while manipulating the wing nut. In accordance with the present invention the wing surfaces manually engaged in the manipulation of the nut are continuous at each side of the bolt to protect the operator's hand from accidental contact with the bolt.

Other objects will appear more particularly from the following disclosure of the invention.

In the drawing.

Like parts are identified by the same reference characters throughout the several views.

Figure 1:
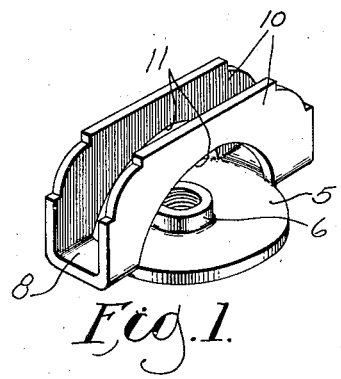
Fig. 1 is a view showing our improved wing nut in perspective.
Figure 2:
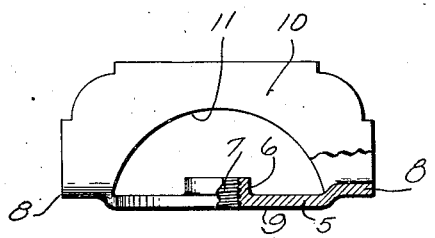
Figs. 2, 3 and 4 show the wing nut in side elevation, in plan, and in end elevation respectively, the structure in Fig. 2 being partially broken away to an axial section.
Figure 3:
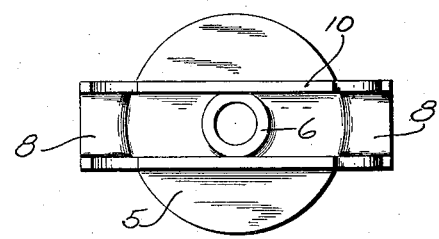
Figure 4:
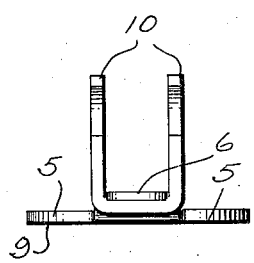

Our improved wing nut comprises a central hub or washer section 5 of disk-like form, the central portion of which has been pressed upwardly at 6 to constitute a sleeve. This sleeve is internally threaded at 7 to receive the bolt with which the wing nut may be engaged.

Projecting from opposite sides of the disk portion 5 of the nut are the ears 8, which are slightly offset axially from the lower face 9 of the disk so as not to abrade or cut into a wooden object with which the surface 9 of disk 5 may be engaged. Integral, in turn, with the ears 8, are the wings 10 which are preferably identical and are parallel. Each wing is in the form of an arch spanning the central washer disk 5 and the threaded nut portion 6 and connecting the oppositely projecting ears 8. The wings 10 may have the ornamental configuration shown and in effect the two wings 10 and the intervening ears 8 with which the wings are both integrally connected, constitute a channel which is offset from the plane of the disk or washer portion 5 of the wing nut but is integrally connected therewith at its opposite sides.

It will be obvious to those skilled in the art that the wing nut as shown can be formed from a blank which is square or substantially square. Two arcuate cuts along the lines 11 of wings 10 separate the wings from the material which is to comprise the washer portion 5 of the device. Thereupon the wings are folded upwardly to the parallel position in which they are illustrated, and at the same time the ear portions 8 of the transverse channel are bodily offset away from the plane of the disk 5 for the purposes described. At any point in the process the central portion of the disk 5 is punched upwardly and threaded to provide the nut proper.

Being made from a substantially square blank, our improved wing nut can be produced with practically no waste of material. At the same time the operations by which it is formed are extremely simple and the resulting product is extremely satisfactory, being light in weight, easily manipulated, and tightly engageable with a wooden object without damage to the surface thereof.

The fact that the wings are continuous at opposite sides of the bolt not only protects the user from accidental injury through contact with the bolt, but also affords a much better grip and makes manipulation of the wing nut much easier than has heretofore been possible in the case of attempts to make wing nuts by stamping. In addition to the increased safety and ease of manipulation, it will be noted that our improved wing nut may easily be manipulated through the use of any conventional wrench or bar if desired.

We claim:

1. A method of manufacture of a wing nut or the like which includes the shearing of a blank upon spaced circuitous lines to define wing portions near the outside of the blank and a central washer portion leaving opposite ends of said wing portions connected to the washer portion and severing the wing portions from the washer portion intermediate such ends, providing the washer portion with threads, and forming the wing portions upwardly to constitute means for manipulating the nut thus constructed.

2. Those steps in the process of wing nut manufacture which include shearing a blank along spaced circuitous lines whereby partially to separate wing portions adjacent the opposite sides of the blank from an intervening washer portion, folding said wing portions upwardly into substantial parallelism and at a spacing determined by intervening ear portions integral both with said wing portions and said washer portions, whereby to constitute a transverse channel, and bodily offsetting said washer portion from said ear portions and providing said washer portion with threads.

3. Those steps in the process of wing nut manufacture which include the shearing of a blank upon mutually spaced arcuate lines whereby to separate marginal portions of the blank from an intervening washer portion thereof, offsetting from said washer portion ear portions of said blank integral with said washer portion and intervening between said marginal portions, folding upwardly said marginal portions to comprise arch-shaped wings integrally connecting the opposed ear portions and integrally connected by said ear portions with said washer portion, punching upwardly in a central part of said washer portion a sleeve integral therewith and threading said sleeve.

4. A wing nut comprising a washer having a threaded central nut portion, ears projecting diametrically from opposite sides of said washer, and a pair of arch-shaped wings spanning said washer in substantial parallelism with each other and connected with said ears, said wings being free of direct connection with said washer and the respective ends of said wings being connected with the respective ears.

5. In a wing nut the combination with a washer having a bearing face and an inoperative face and a central threaded nut portion and integral ears projecting diametrically from said washer and offset therefrom above the inoperative face whereby to afford clearance for the bearing face of said washer, of a pair of wings spanning the inoperative face of said washer in substantial parallelism and each connected at its respective ends with both said ears.

6. A one piece wing nut comprising a combined washer and nut portion provided with threads, and a channeled wing portion integral with said washer portion and offset therefrom, said channeled wing portion having arch-shaped wings interconnected at their ends by ears integral with said washer portion, said wings being substantially free of said washer portion save for connection therewith through said ears.

7. A one piece wing nut comprising the combination with a washer having a bearing face and an integral central threaded boss projecting from the washer oppositely from said face, of a pair of wings extending across said washer between marginal side portions thereof and at either side of said boss, said wings being integrally connected at their respective ends marginally with said washer and arching free of said washer intermediate said ends.

8. A one piece wing nut comprising the combination with a washer of disk form provided centrally with a threaded portion and having a bearing face, of ears integral with said washer and projecting diametrically therefrom, said ears being bodily offset away from said bearing face, and wings integral with said washer and ears and formed inwardly from the margins of said washer intermediate said ears, whereby to extend from one ear to the other upon minor chords of said washer.

9. A method of manufacturing a wing nut or the like, which includes forming a blank with sufficient stock for a central washer-nut and wings for the manipulation thereof, making arcuate cuts in said blank between the washer-nut central portion thereof and lateral portions thereof to comprise said wings, said cuts being made wholly within said blank, whereby to leave the wing portions of the blank connected at their respective ends to each other and to the washer-nut portion of the blank, providing the washer-nut portion of the blank with threads substantially at its center, and forming the wing portions of the blank upwardly into substantial parallelism spanning the washer-nut portion of the blank upon minor chords thereof at either side of such threads and well within the margins of the blank.

10. A method of manufacture of a one piece wing nut or the like, which includes the forming of a washer-nut central blank portion having a bearing face and an opposite face, and the provision of threads centrally therein and opening to said bearing face, the folding of side portions of the blank centrally toward each other over said opposite face of the washer-nut portion and substantially symmetrically at opposite sides of said threads to comprise wings for the manipulation of the washer-nut portion, leaving each of said wings integrally connected at its respective ends with the other wing and with the washer-nut portion and forming such wings to be continuous across the washer-nut portion on chords of said opposite face and wholly free of said bearing face.

JOSEPH L. SCHWABE, Jr.
ERWIN L. SCHMIDT.